United States Patent [19]

Winter

[11] 3,871,874
[45] Mar. 18, 1975

[54] PURIFICATION OF VANADIUM-CONTAINING TICL₄ BY HEATING WITH TICL₃·0.33 ALCL₃

[75] Inventor: Gerhard Winter, Krefeld, Germany

[73] Assignee: Bayer Aktiengesellschaft, Leverkusen, Germany

[22] Filed: Apr. 2, 1973

[21] Appl. No.: 347,584

[30] Foreign Application Priority Data
Apr. 15, 1972  Germany............................ 2218361

[52] U.S. Cl............ 75/84.5, 423/492, 423/76, 423/77, 423/75, 423/612
[51] Int. Cl............................................ C22b 53/00
[58] Field of Search........ 75/84.5; 423/492, 76, 77, 423/75, 612

[56] References Cited
UNITED STATES PATENTS

| | | |
|---|---|---|
| 2,770,541 | 11/1956 | Singleton.............................. 423/76 |
| 2,879,131 | 3/1959 | Cauwenberg et al................. 423/76 |
| 2,953,433 | 9/1960 | Newnham............................. 423/76 |
| 2,958,574 | 11/1960 | Hansley et al....................... 75/84.5 |
| 3,009,772 | 11/1961 | Wigginton............................ 423/76 |
| 3,769,233 | 10/1973 | Hermans et al...................... 423/492 |

Primary Examiner—Benjamin R. Padgett
Assistant Examiner—B. Hunt
Attorney, Agent, or Firm—Burgess, Dinklage & Sprung

[57] ABSTRACT

A process for the purification of vanadium-containing titanium tetrachloride which comprises heating vanadium-containing titanium tetrachloride to a temperature of about 120° to 180° C in the presence of $TiCl_3 \cdot 0.33\ AlCl_3$, and separating the resulting vanadium-free $TiCl_4$ from the solids.

7 Claims, No Drawings

PURIFICATION OF VANADIUM-CONTAINING TiCl₄ BY HEATING WITH TiCl₃ 0.33 AlCl₃

This invention relates to a process for the continuous removal of vanadium impurities from titanium tetrachloride by heating in the presence of TiCl$_3$ · 0.33 AlCl$_3$.

One of the processes currently used for the production of pure white titanium dioxide pigments is the combustion process in which purified titanium tetrachloride is directly reacted with oxygen to form titanium dioxide pigments. The titanium tetrachloride required for this purpose is obtained by the chloridizing dissociation of titanium-containing materials for example, ilmenite, leucoxene or rutile, and contains as impurities a number of other chlorides, predominantly those of iron, aluminum, vanadium and silicon. To obtain a pure white titanium dioxide pigment, it is essential to remove these impurities. One preferred process for purifying titanium tetrachloride is distillation. Titanium tetrachloride boils at 136°C and, by distillation, can be separated off from most of its impurities, for example, iron chloride, aluminum chloride and silicon tetrachloride. Vanadium is normally present in the form of VOCl$_3$ or VCl$_4$, both of which boil at about the same temperature as titanium tetrachloride. For this reason, the separation of these compounds from the crude titanium tetrachloride by distillation is difficult and extremely expensive.

Several proposals have already been put forward for ways of removing vanadium compounds from titanium tetrachloride. For example, purification methods employing hydrogen sulfide, animal and vegetable oils, fats, waxes, resins, soaps, metals or metal salts have become known. Purifying agents of the kind which can readily be separated off again from the purified TiCl$_4$, either because they have a different boiling point or because they can be removed in the form of solids, are of particular advantage.

One substance which has a purifying effect upon vanadiumcontaining titanium tetrachloride and which, in addition, has the advantage that it does not introduce any undesirable impurities into the TiCl$_4$, is TiCl$_3$ or, generally, titanium subhalides. Accordingly, titanium subhalides have been adopted as purifying agents.

U.S. Pat. No. 2,178,685, relates to a process for purifying vanadium-containing titanium tetrachloride in which a titanium subhalide, for example TiCl$_3$ is added to the yellow-colored vanadium-containing TiCl$_4$. After boiling for 2 or more hours, purified TiCl$_4$ can be distilled off.

Unfortunately, the long reaction time which is required for the complete removal of vanadium compounds, is a serious disadvantage because considerable quantities of TiCl$_4$ are produced and used in the production of titanium dioxide on an industrial scale and, in view of this reaction time, the intermediate purifying stage necessitates extremely large reaction vessels.

It is accordingly an object of the invention to find a quick simple process for the continuous removal of vanadium-containing impurities from titanium tetrachloride.

These and other objects and advantages are realized in accordance with the present invention pursuant to which vanadium-containing titanium tetrachloride is heated to between about 120° and 180°C in the presence of TiCl$_3$ · 0.33 AlCl$_3$ and the purified, vanadium-free titanium tetrachloride is separated off from the solids.

This process has the considerable advantage that, by virtue of the short reaction time (amounting to a matter of seconds or minutes), purification can now be carried out continuously in vessels of small dimensions, for example a flow tube. No undesirable impurities are introduced or formed by the compound TiCl$_3$ · 0.33 AlCl$_3$, which represents a solid solution of TiCl$_3$ and AlCl$_3$ which is insoluble in TiCl$_4$. Any traces of AlCl$_3$ which may be given off to the TiCl$_4$ are harmless because in any event AlCl$_3$ is added as a rutilizing aid in conventional methods of producing TiO$_2$ pigments by the combustion of TiCl$_4$. In addition, they can readily be removed during the distillation stage, which is normally carried out afterwards in order to separate SiCl$_4$ and other chlorides.

The co-crystallizate TiCl$_3$ · 0.33 AlCl$_3$, which can be used for purification in accordance with the invention, can be produced in accordance with the processes described in the literature by the reduction of TiCl$_4$ with Al-powder. It is a substance widely used in the art, being employed together with aluminum alkylene as a catalyst component for the polymerization of olefins. For this purpose, the compound TiCl$_3$ · 0.33 AlCl$_3$ is normally subjected to an activating dry-grinding operation, although this does not have any bearing upon the process according to the invention. Ground or unground samples can be used with equal effect for purification.

The reaction on which the purification is based is not altogether clear. However, it can be assumed that the vanadium present in the form of VOCl$_3$ or, possibly to a lesser extent, in the form of VCl$_4$, is reduced by the TiCl$_3$ · 0.33 AlCl$_3$ present into lower-valence, non-volatile vanadium compounds. The TiCl$_3$ · 0.33 AlCl$_3$, used in the form of a violet-colored powder is converted into a mass colored from dark brown to black.

The quantity required for the complete removal of vanadium is governed by the vanadium content of the crude TiCl$_4$. A quantity of about 2 to 15 g of TiCl$_3$ · 0.33 AlCl$_3$ is normally used per gram of vanadium-containing impurity calculated as VOCl$_3$ a particularly fast reaction, amounting to less than 1 minute at the boiling point, being obtained with a larger quantity. It is preferred to use a quantity of about 3 to 9 g of TiCl$_3$ · 0.33 AlCl$_3$ per g of VOCl$_3$.

Purification is preferably carried out either at or just below the boiling point of TiCl$_4$. The yellow color of the vanadium-containing TiCl$_4$ disappears almost instantaneously and, after only about 0.5 to 1.5 minutes, it is possible to distil off vanadium-free, completely colorless TiCl$_4$ (V-content less than 1 ppm). In this case, it is possible to work under normal pressure. However, it is readily possible to carry out purification above the boiling point of TiCl$_4$, in which case it is necessary to work under excess pressure. For example, purification can be carried out at a TiCl$_4$-temperature of about 150° to 180°C under a pressure of from about 2 to 3 atms. In this case, the reaction takes place even more quickly than it does under normal conditions. In general, however, the reaction takes place sufficiently quickly at the boiling point under normal pressure.

The purified TiCl$_4$ is preferably separated off by distillation. To carry out the process according to the invention, the requisite quantity of TiCl$_3$ · 0.33 AlCl$_3$ can be added to boiling vanadium-containing crude TiCl$_4$, and vanadium-free TiCl₄ can be immediately distilled off. This procedure is particularly suitable for the production of highly pure TiCl₄ on a laboratory scale. The continuous procedure, in which a suspension of TiCl₃ · 0.33 AlCl₃ in TiCl₄ which can be subsequently removed from the circuit, is introduced into the incoming, hot stream of crude, liquid titanium tetrachloride at a given point of the pipeline, followed by transfer to the distillation stage, is of particular advantage for large-scale work. By the time the stream enters the distillation apparatus, the purification process is already over, and the total time in the pipeline is about 1 to 10 minutes, preferably about 1 to 3 minutes, providing the temperature has been kept at boiling point. In an alternative procedure, a suspension of TiCl₃ · 0.33 AlCl₃ in TiCl₄ is initially introduced, incoming hot, gaseous, crude TiCl₄ is condensed in the suspension and vanadium-free TiCl₄ is continuously distilled off at another point of the sump. By the simultaneous, measured introduction of TiCl₃ · AlCl₃ the optimum purification conditions can be maintained.

However, the purified titanium tetrachloride can also be separated off by filtration because the reaction products left after purification are solid, filterable and insoluble in TiCl₄. In general, however, distillation is preferred because it is a customary stage in the process for the production of TiCl₄ on an industrial scale.

The TiCl₄ produced in accordance with the invention is pure white, crystal-clear and almost completely free from vanadium (V-contents less than 0.5 ppm). It is therefore particularly suitable for the production of TiO₂-pigments by the combustion process. In addition, it is particularly stable to light. Even after standing for several months in sunlight, there are no signs of the yellow tinges often observed in the case of TiCl₄ which has been freed from vanadium by other methods. Accordingly, it can also be used as an extremely pure starting substance which is particularly suitable for the production of pure titanium compounds and pure titanium metal.

The process according to the invention is illustrated in the following Examples:

EXAMPLE 1

The following tests were carried out to demonstrate the fast, intensive purifying effect of TiCl₃ · 0.33 AlCl₃ by comparison with TiCl₃: 5 kg of TiCl₄ containing 790 ppm of vanadium (VOCl₃ content = 13.5 g) were heated to boiling point in each of two spherical flasks equipped with stirrers and distillation attachments. On reaching the boiling point, 92 g of TiCl₃ · 0.33 AlCl₃ (6.81 g/g of VOCl₃) were added to the first flask and 72 g of standard commercial TiCl₃ (5.33 g/g of VOCl₃) to the second flask. Since the compound TiCl₃ · 0.33 AlCl₃ effectively contains 77.6 % of TiCl₃, 71.4 g of TiCl₃ in the form of TiCl₃ · 0.33 AlCl₃ were thus introduced into the first flask, as against 72 g in the second flask, i.e., substantially the same quantities. After the TiCl₄ vapor originally present in the apparatus had been displaced by the TiCl₄ vapor formed after the addition, which took from 1 to 1.5 minutes, the distillation of TiCl₄ was commenced. The distillates were collected and examined for their vanadium content at certain time intervals. The values set out in Table 1 were obtained:

Table 1

| time elapsing after addition of the purifying agent | TiCl₃·0.33 AlCl₃ distillate from flask 1 | | TiCl₃ distillate from flask 2 | |
|---|---|---|---|---|
| | V-content | appearance | V-content | appearance |
| 1.5 mins | 1 ppm | crystal-clear colorless | >> 100 ppm | bright yellow |
| 30 mins | 0.5 ppm | do. | 27.6 ppm | yellow |
| 90 mins | 0.5 ppm | do. | 9.3 ppm | yellowish |
| 210 mins | 0.5 ppm | do. | 2.6 ppm | pale yellowish |

EXAMPLE 2

The following test arrangement was selected for the continuous purification of TiCl₄. The TiCl₄ formed during the chlorination of a TiO₂-coke mixture, which had been freed by filtration from suspended solid particles and which contained 1,000 ppm of vanadium in the form of VOCl₃ and 3 ppm of Fe in the form of FeCl₃, was introduced in the form of a continuous stream into a mixing chamber into which was pumped a suspension of TiCl₃ · 0.33 AlCl₃ in TiCl₄ in such a quantity that the suspension continuously running off to the distillation still contained 7.24 g of TiCl₃ · 0.33 AlCl₃ per g of VOCl₃. The TiCl₄ entering the mixing chamber had a temperature of 120°C. The temperature between the mixing chamber and the distillation still was increased to boiling point. A distillation still rotating in a heating bath kept at from 170° to 200°C was used as the distillation vessel, from which the inflowing TiCl₄ was continuously distilled off. The throughput amounted to 3 l of TiCl₄/h, and the time during which the crude TiCl₄ was in contact with TiCl₃ · 0.33 AlCl₃ was about 5 minutes when the reaction had progressed to such an extent that the distillation still essentially contained only the solid purification residue and the inflowing TiCl₄ was immediately distilled off. It was possible to increase the throughput to 5 l of TiCl₄/h (average contact time about 3 minutes) without VOCl₃ breaking through by simultaneously intensifying the heating of the mixing chamber, the feedpipe to the distillation still and the heating bath liquid, the temperature reaching almost 136°C before entry into the distillation still. In both cases, it was possible to obtain a water-clear, colorless TiCl₄ distillate with a vanadium content of less than 1 ppm.

EXAMPLE 3

The following test arrangement was selected for the continuous purification of gaseous TiCl₄ containing VOCl₃. Gaseous, crude titanium tetrachloride containing 660 ppm of V in the form of VOCl₃, was condensed into a 2-liter stainless steel vessel which was divided into two halves by a partition reaching almost but not quite to the bottom of the vessel. A suspension of 12 g of $TiCl_3 \cdot 0.33\ AlCl_3$ in 108 g of $TiCl_4$ was introduced into one half at the same time as the gaseous crude titanium tetrachloride, in such a quantity that 5.34 g of $TiCl_3 \cdot 0.33\ AlCl_3$ were available per g of freshly arriving $VOCl_3$. The reaction mixture formed, which was kept at the boiling point of the $TiCl_4$, gradually passed through under the partition into the second half of the reaction vessel in whose upper part a recirculation evaporator continuously distilled off the purified $TiCl_4$ and from which the spent purifying agent could be removed into a sump from which additional pure $TiCl_4$ was obtained and combined with the main runnings. The pure $TiCl_4$ was crystal clear and contained less than 1 ppm of V. In this procedure, it was possible to continuously react approximately 11.6 kg of reaction mixture per hour.

The purified products are especially suited for conversion into other titanium products of markedly high purity, e.g. reduction to titanium metal, oxidation to titanium dioxide, and the like.

It will be appreciated that the instant specification and examples are set forth by way of illustration and not limitation and that various modifications and changes may be made without departing from the spirit and scope of the present invention.

What is claimed is:

1. A process for the purification of vanadiumcontaining titanium tetrachloride which comprises heating vanadium-containing titanium tetrachloride to a temperature of about 120° to 180°C in the presence of $TiCl_3 \cdot 0.33\ AlCl_3$, and separating the resulting vanadium-free $TiCl_4$ from the solids.

2. The process of claim 1, wherein the purification is carried out at atmospheric pressure at the boiling point of titanium tetrachloride.

3. The process of claim 1, wherein the $TiCl_3 \cdot 0.33\ AlCl_3$ is added to the crude titanium tetrachloride in an amount of about 2 to 15 g per g of vanadium-impurity calculated as $VOCl_3$.

4. The process of claim 1, wherein the $TiCl_3 \cdot 0.33\ AlCl_3$ is added to a stream of hot liquid vanadium-containing titanium tetrachloride, the stream is passed through a pipe section heated to about 136°C with a residence time therein of about 1 to 10 minutes, and purified $TiCl_4$ is thereafter separated by distillation.

5. The process as claimed in claim 1, wherein the vanadium-containing crude titanium tetrachloride is introduced in gaseous form into a suspension of $TiCl_3 \cdot 0.33\ AlCl_3$, and purified vanadium-free $TiCl_4$ is distilled off.

6. The process of claim 1 including the further step of reducing the purified titanium tetrachloride to high-purity titanium metal.

7. The process of claim 1 including the further step of oxidizing the purified titanium tetrachloride to high-purity titanium dioxide.

* * * * *